Dec. 5, 1967  E. C. TETSULL  3,355,789
MULTI-STAGE PARALLEL-AXIS GEAR TRANSMISSION
AND MANUFACTURING METHOD THEREFOR
Filed Oct. 13, 1965  2 Sheets-Sheet 1

INVENTOR
EDWIN C. TETSULL
By
Maybee & Legris
ATTORNEYS

Dec. 5, 1967  E. C. TETSULL  3,355,789
MULTI-STAGE PARALLEL-AXIS GEAR TRANSMISSION
AND MANUFACTURING METHOD THEREFOR
Filed Oct. 13, 1965  2 Sheets-Sheet 2

INVENTOR
EDWIN C. TETSULL
BY
Maybee & Legris
ATTORNEYS

United States Patent Office 3,355,789
Patented Dec. 5, 1967

3,355,789
MULTI-STAGE PARALLEL-AXIS GEAR TRANSMISSION AND MANUFACTURING METHOD THEREFOR
Edwin Clifford Tetsull, Oakville, Ontario, Canada, assignor to Hawker Siddeley Canada Ltd., Toronto, Ontario, Canada, a company of Canada
Filed Oct. 13, 1965, Ser. No. 495,442
9 Claims. (Cl. 29—159.2)

ABSTRACT OF THE DISCLOSURE

A method of achieving even distribution of the running load among the layshafts of a parallel-axis gear transmission system having two sun gears and a plurality of layshafts spaced thereabout comprising the steps of meshing the planetary gears with their respective sun gears, locking the sun gears against rotation with respect to the layshafts, loading the planetary gears into backlash-free engagement with the respective sun gears and then fixing the planetary gears to their respective layshaft.

---

This invention relates to gear transmissions and more particularly to high-speed, high torque, multi-stage, parallel-axis gear transmissions and means for manufacturing same.

There are many applications where a reduction or step-up gear is required between driving and driven units. Quite often the requirement is for a transmission having co-axial input and output shafts where installation space is limited. There are some very efficient epicyclic gear transmissions, such as those of Stoekicht design, which will fill many requirements, but they are restricted by several disadvantages. Although the epicyclic gear has a high torque capacity, the output speed is limited by the centrifugal loading on the planet gear bearings. Due to the incorporation of internally-toothed ring gears and their support mechanisms, a large radial silhouette results. At least one bearing is required to support the planet carrier. This is sometimes put to good use in that the driven machine can dispense with one bearing. However, if the driven machine has an independently supported shaft the planet carrier requires an additional bearing. The complexity of design and manufacture, associated with annulus gears which are intentionally made flexible for elastic deformation during running to ensure load sharing, results in very high cost.

Present parallel-axis type gear transmissions have disadvantages of their own: one being the heavy side thrust on shaft bearings due to the radial thrust exerted by interaction of the meshing gear teeth. Bearing loads are heavy in general and frictional losses can be quite high, particularly in high-speed applications. With input and output shafts fixedly located, flexible couplings are required to compensate for shaft misalignment with associated units.

In order to reduce side thrust on input and output shafts and to increase the load capacity, it is common practice in multi-stage gearing to employ a number of identical layshaft gears (usually three) equi-angularly disposed about the input and output shafts. While this solves one problem, it creates another: that of proper load sharing between the layshaft gears. It is impossible to make two or more components precisely similar. Machining tolerances of 0.0002 in. have been known to cause trouble in gear transmissions and holding tolerances below this level in the machining of medium to large gears is beyond the present state of the art.

Various devices have been proposed and used for overcoming the problems resulting from machining inaccuracies, involving means to provide relative angular movement between layshaft pinions and gears to take up variations in gear tooth clearances. Probably the most popular device is the split layshaft flexibly connected by means of a torque shaft. Use of a combination of spur and helical gears will permit errors of mismatch to be materially reduced by shimming and accurate positioning of the layshaft gears axially. Helical gears, of course, introduce axial thrust forces which must be counterpoised by thrust bearings.

Helical gears have two big advantages over spur gears in that there is a considerably smoother transfer of load from one tooth to another and the noise level in operation is lower. The disadvantage of axial thrust associated with single helical gearing can be fully overcome by the use of double helical gears. However, in using these gears in a multi-stage multi-layshaft gear arrangement, the problem of load sharing between the layshaft gears is rendered more acute since inaccuracies in axial as well as peripheral directions are introduced.

The present invention proposes to reduce tooth mismatch due to machining inaccuracies to an acceptable minimum by the accurate pre-phasing of layshaft "planet" gears to common input and output "sun" gears. The manufacturing method herein described may usefully be employed with spur gearing or double-helical gearing. When double-helical gearing is used then the transmission may be designed to have fully floating input and output gears. These may be directly coupled to adjacent units by well-known means such as splined quill-shaft drives. The need for more elaborate flexible couplings is thereby obviated.

It is the main object of the present invention to provide a multi-stage, parallel axis gear transmission having very accurately phased layshaft gears.

Other objects and advantages will become apparent from the following description and drawings wherein like reference characters refer to like parts throughout and in which.

Figure 1:
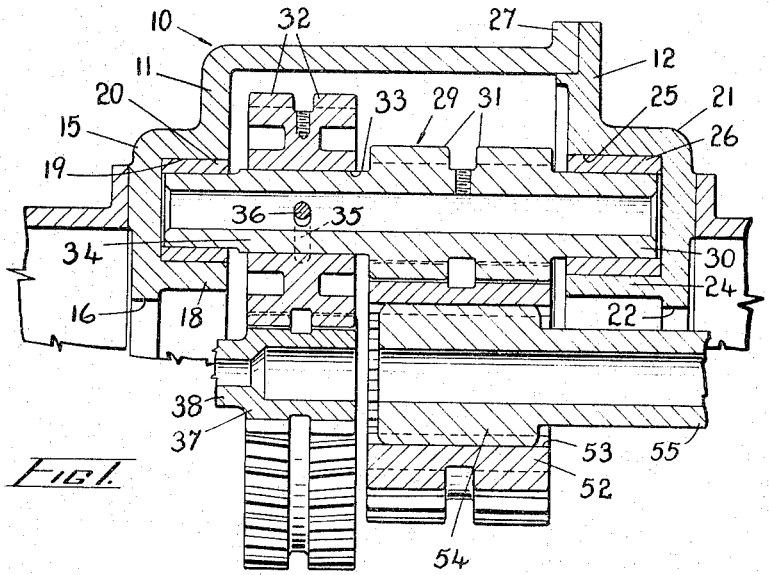
FIG. 1 is a part axial sectional view of a two-stage, parallel-axis gear transmission constructed in accordance with the invention.

Referring now more particularly to FIG. 1, a partly shown gear casing 10 is generally cylindrical about the axis A—A and has an integral end wall 11 and a removable end wall 12. A central extended portion 15 of end wall 11 is provided with abore 16 co-axial with respect to casing 10. Equi-angularly disposed within and circumferentially of the portion 15 are three bosses such as 18 (only one shown). The bosses are bored as at 19 and provided with bearing inserts such as 20.

Removable end-wall 12 is of similar configuration to end-wall 11. A central extended portion 21 is provided with a co-axial bore 22 and has internally three bosses such as 24 (only one shown) similarly disposed therein to bosses 18. The bosses are bored as at 25 and provided with bearing inserts such as 26. End-wall 12 is removably attached to a peripheral flange 27 of casing 10 by bolts in the conventional manner.

The gear train will now be described with detailed reference to one layshaft gear assembly generally indicated at 29. The other two precisely similar layshaft assemblies are designated 29a and 29b but neither of these appears in FIG. 1. The positional relationship of the three layshafts will be understood from FIG. 3. A hollow shaft 30 rotatably carried in the bearings 20 and 26 has machined integrally therewith a double helical planetary gear 31. (Thus there exist corresponding double helical planetary gears 31a and 31b not shown). A second double helical planetary gear 32 having a bore 33 is carried on a plain portion 34 of the shaft 30. A bore 35 extending diametrically through the gear 32 and the shaft 30 carries a pin 36 which rigidly locks the gear 32 to the shaft 30.

Figure 3:
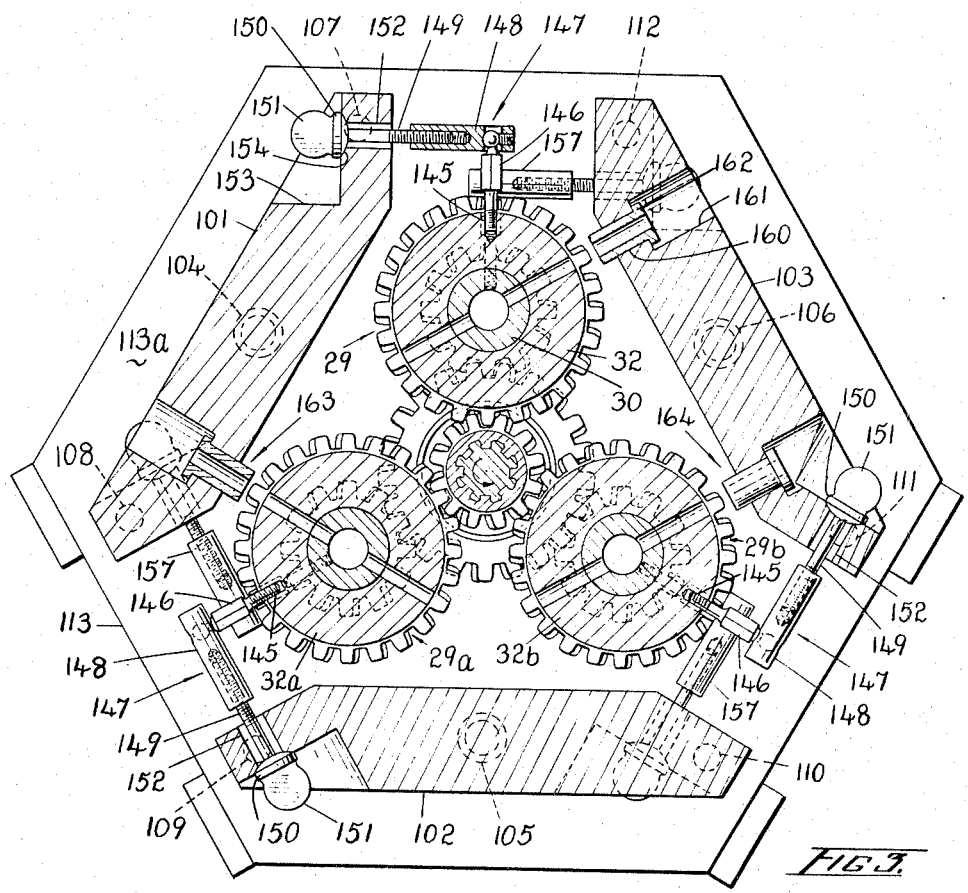
FIG. 3 is a lateral sectional view of the jig taken at line 3—3 of FIG. 2.

Entirely supported by gear 32 and gears 32a and 32b in a configuration like that shown in FIG. 3, is a double helical "sun" gear or pinion 37. The pinion's end float is restricted by the double-helical configuration of the gear teeth. Pinion 37 is provided at one end with an axial extending stub shaft 38 (broken off in FIG. 1) which serves to transmit torque to the pinion 37 in known manner.

Supported by planetary gears, in the same manner as the sun gear 37 is supported, is a sun gear 52. Gear 52 has an internally splined bore 53 in engagement with which is a splined end 54 of a coupling shaft 55 which is broken off in FIG. 1, and which serves to transmit torque from the sun gear 52 in known manner.

Figure 4:
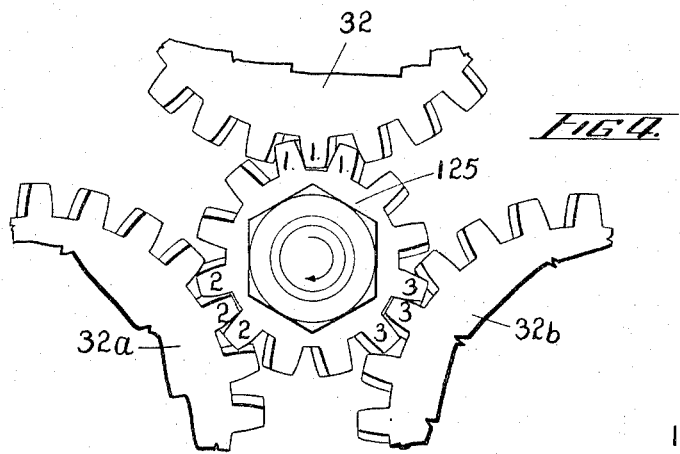
FIG. 4 is an enlarged view of a portion of FIG. 3.

It will be clear that, for a gear transmission constructed in accordance with the above description to operate without backlash or gear tooth interference, the relative radial positions of the two planetary gears on a given layshaft must be correctly determined in conjunction with the other layshafts before the planetary gear 32 is fixed to the layshaft. The jig by means of which this correct determination of relative radial positions, or "phasing," of the layshafts is accomplished will now be described with reference to FIGS. 2, 3 and 4.

A first regular hexagonal plate 100 (FIG. 2) has three upstanding walls 101, 102 and 103 welded to a surface 100a adjacent to alternate peripheral edges thereof. Free ends of the walls are taper bored at 104, 105 and 106 respectively and are provided with threaded bores at 107–112. A second regular hexagonal plate 113 (visible in FIG. 3) has a surface 113a which abuts the free ends of walls 101, 102 and 103. Plate 113 is taper bored as at 114 in FIG. 2, in alignment with taper bores 104, 105 and 106, to receive locating taper pins such as 115. Plain bores such as 116 in alignment with the threaded bores 107–112 permit the plate 113 to be removably attached to the free ends of walls 101, 102 and 103 by bolts such as 117 so that plates 100 and 113 are in accurate, spaced, parallel alignment.

Plate 100 is provided with a central boss 118 extending from a surface 100b and bored at 119 to receive a shaft 120 having two accurately ground lands 121 and 122 contacting the bore. One end of the shaft is provided with a radial flange 123 which will abut surface 100a, and a splined portion 124 adapted to receive a double helical master sun pinion 125 which is retained thereon by a nut 126 on a threaded portion 127. Another end of shaft 120 terminates in a threaded portion 128 having a squared end 129. A nut 130 is carried on the threaded portion so as to abut an end surface 131 of boss 118.

Similarly plate 113 is provided with a central boss 132 extending from a surface 113b and bored at 133 to receive a shaft 134 having two lands 135 and 136 contacting the bore. One end of the shaft is provided with an integrally formed hollow double helical master sun gear 137 having a collar 138 which will abut surface 113a. Another end of shaft 134 terminates in a threaded portion 139 having a squared end 140. A nut 141 is carried on the threaded portion so as to abut an end surface 142 of boss 132.

Bores 119 and 133 are in axial alignment. The apparatus thus far described provides means for supporting a master sun gear 125, corresponding to input sun gear 37 in the transmission shown in FIG. 1, and a master sun gear 137 corresponding to transmission output sun gear 52, in the positional relationship that these gears would occupy in the transmission gear train. These master gears may also be locked in any rotational angular relationship.

Plates 100 and 113 are accurately through bored at 143 and 144 respectively (FIG. 2), and also at equi-angular stations about central bores 119 and 133 to carry the three layshaft gear assemblies 29, 29a and 29b, as best understood by reference to FIG. 3. Each layshaft planetary gear 32, 32a and 32b is provided with a threaded hole 145 radially drilled in the central channel between the two rows of helical teeth. A ball-end fitting 146 is screwed into each hole 145. Operatively attached to each ball-end fitting 146, is an adjustable screw member generally indicated at 147. Member 147 comprises a barrel 148, adapted to receive ball-end fitting 146 at one end and internally threaded to receive a threaded shaft 149 at another end. Threaded shaft 149 carries a freely rotating part-spherical washer 150 and terminates in a thumbscrew head 151. A bore 152 in an end of wall 101 is provided with a large counterbore 153 and a spherical countersink 154. Threaded shaft 149 extends through bore 152, and part-spherical washer 150 seats itself in countersink 154. Identical adjustable screw members 147 are provided for gears 32a and 32b.

Figure 2:
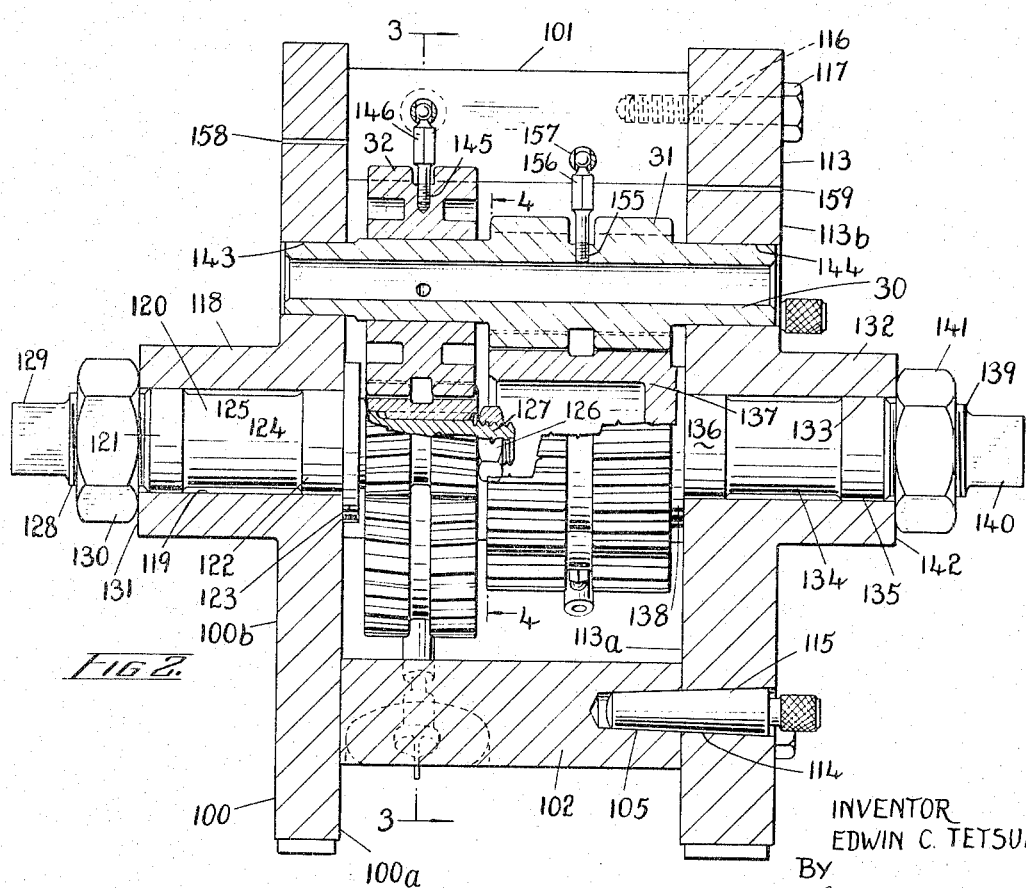
FIG. 2 is an axial sectional view of a jig for phasing layshaft gears.

Each layshaft pinion 31 is provided with a threaded radially drilled hole such as 155 (FIG. 2). A ball-end fitting 156 similar to ball-end fitting 146 is screwed into hole 155 and an adjustable screw member 157 similar to screw member 147 is provided for each ball-end fitting 156.

Through plates 100 and 113 coincident with the planes containing the common axis of the sun gears and the axes of layshaft assemblies 29, 29a and 29b, and at radial positions opposite to ball-end fittings 146 and 156, are drilled sighting holes 158 and 159 respectively (FIG. 2).

Through wall 103 in the plane represented by line 3—3 in FIG. 3 and which is the plane containing the apices of the teeth of gears 32, 32a and 32b is a drill guide bore 160 having a counterbore 161 and carrying a hardened drill bushing 162. The longitudinal axis of this bore intersects the longitudinal axis of layshaft assembly 29. Similar drill guide bores are provided for layshaft assemblies 29a and 29b at 163 and 164 respectively.

In operation: plate 113 is separated from plate 100 by removal of the six bolts 117. A set of three layshaft assemblies 29, 29a and 29b are mounted with gears 32, 32a and 32b. Each gear has previously had a tooth most nearly diametrically opposite to its tapped hole 145 marked 1, 2 and 3 respectively in the manner shown in FIG. 4. Three equi-angularly spaced pairs of teeth of the master sun pinion 125 have been marked 1—1, 2—2 and 3—3. Each gear 32, 32a, 32b in turn, is meshed to the match marks on sun gear 125 with its layshaft 30 partially withdrawn. Once the gears are meshed, the layshaft ends may be slipped into the respective bores 143. The gears 32, 32a and 32b may then be held in mesh with the pinion 125 by a heavy duty rubber ring or other elastic means. With the nut 130 slacked right off, the shaft 120 may be partially withdrawn from the bore 119 until the layshafts 30 are clear of the bores 143. Master sun gear 137 now completely removed from plate 113 may now be manipulated into mesh with the layshaft gears 31 without losing the meshing relationship of the gears 32 with the pinion gear 125. Care must be taken to ensure that the holes 155 in layshaft gears 31 face radially outward with respect to the axis of the gear 137.

With the full train meshed, the layshafts 30 may be slipped back into the bores 143 and the slack taken up on the nut 130. The rubber band may now be removed and ball-end fittings 146 and 156 installed as appropriate. Adjustable screw members 147 are then connected to the ball-end fittings 146 and the members 157 are connected to the ball-end fittings 156. Finally the plate 113 is offered up to the plate 100, the shaft 134 is entered into the bore 133 and the shafts 30 are entered into their respective bores 144. Once home, the taper pins 115 are fitted to locate the plate and the bolts 117 are entered and tightened. The nut 141 is replaced on the threaded portion 139 of the shaft 134.

With the jig loaded, one screw member 157 is operated to bring the ball-end fittings 156 into line with the sighting holes 159. The gear 137 is then locked tight by means of the locknut 141. One screw member 147 is then operated to line up the ball-end fittings 146 with their sighting holes 158. The pinion 125 is then locked by means of the nut 130. With gears 125 and 137 firmly locked, all the screw members 147 are operated to load the gears 32, 32a and 32b into backlashless engagement with the pinion 125. Then all the screw members 157 are operated to load the planetary gears into backlashless engagement with the gear 137. As will be clear from FIG. 3, the direction of the loading on all the planetary gears 32, 32a and 32b is the same, and the direction of the loading on all the planetary gears 31, 31a and 31b is the same. Furthermore, the first direction mentioned above is opposite to the second-mentioned direction. This opposition of directions creates the same kind of loading on the planetary gears as that encountered during operation of the parallel axis gear transmission system. The layshaft planetary gears 32, 32a, and 32b are now each correctly phased with respect to their respective layshaft gears 31, 31a and 31b. The jig is now offered up to a precision drilling machine and holes 35 are bored through gears and layshafts through drill guide bores 162, 163 and 164.

Marked with assembly marks, the layshaft assemblies are removed from the jig and pins 36 are driven into bores 35 to rigidly attach the gears to the shafts. The three layshaft assemblies now constitute a set which will mate correctly with any pair of input and output sun gears. The input sun gear will be marked 1—1, 2—2, 3—3 (FIG. 4) as in the case of the master pinion in the jig so that the same meshing relationship will be obtained.

What I claim as my invention is:

1. A method for achieving substantially even distribution of the running load among layshafts in a parallel axis gear transmission system including a first and a second sun gear, a plurality of layshafts spaced about the sun gears, a first planetary gear on each layshaft mounted to be initially adjustable both angularly and axially of the layshaft and intended to mesh with the first sun gear, and a second planetary gear fixed to each layshaft and intended to mesh with the second sun gear, comprising:
meshing the planetary gears with their respective sun gears,
locking the sun gears against rotation with respect to the layshafts,
loading the first planetary gears into backlashless engagement with the first sun gear, and the second planetary gears into backlashless engagement with the second sun gear,
and fixing the first planetary gears to their respective layshafts.

2. A method for achieving substantially even distribution of the running load among layshafts in a parallel axis gear transmission system including a first and a second sun gear, a plurality of layshafts spaced about the sun gears, a first planetary gear on each layshaft mounted to be initially adjustable both angularly and axially of the layshaft and intended to mesh with the first sun gear, and a second planetary gear fixed to each layshaft and intended to mesh with the second sun gear, comprising:
meshing the planetary gears with their respective sun gears,
locking the sun gears against rotation with respect to the layshafts,
loading all the planetary gears into backlashless engagement with their respective sun gears, the direction of the loading on all the first planetary gears being the same, and the direction of the loading on all the second planetary gears being the same,
and fixing the first planetary gears to their respective layshafts.

3. A method as claimed in claim 2 in which the direction of the loading on the first planetary gears is opposite to the direction of the loading on the second planetary gears.

4. A method as claimed in claim 3 in which the directions of the loading on the planetary gears are the same as those encountered during operation of the parallel axis gear transmission system.

5. A method as claimed in claim 2 in which the layshafts are three in number and are spaced equi-angularly about the sun gears.

6. A method as claimed in claim 2 in which the first planetary gears are double helical gears.

7. A method as claimed in claim 2 in which the first planetary gears are spur gears.

8. A method as claimed in claim 2 in which the first planetary gears are fixed to their respective layshafts by drilling through the first planetary gears and their respective layshafts and inserting pins into the bores thus formed.

9. A method as claimed in claim 2 wherein the first and second planetary gears are loaded by fastening a radially extending removable pin to each of the first and second planetary gears and applying to the free end of the pin force in a direction that is substantially normal to the axis of the pin and in the plane of rotation of the pin to cause the respective pinions to rotate into backlashless engagement with the respective sun gears.

References Cited
UNITED STATES PATENTS

| | | | |
|---|---|---|---|
| 1,851,147 | 3/1932 | Banker | 74—802 |
| 1,864,170 | 6/1932 | Chilton | 74—7 |
| 2,393,098 | 1/1946 | Freeman | 29—159.2 |

THOMAS H. EAGER, *Primary Examiner.*